Oct. 4, 1966  S. VAINES ET AL  3,276,809
BUNCHING HOOK

Filed Feb. 4, 1964  2 Sheets-Sheet 1

INVENTORS:
SAMUEL VAINES
EWEN MORRISON

BY Dawson, Tilton, Fallon, Lungmuss Alexander
ATT'YS

Oct. 4, 1966 S. VAINES ET AL 3,276,809
BUNCHING HOOK
Filed Feb. 4, 1964 2 Sheets-Sheet 2

INVENTORS:
SAMUEL VAINES
EWEN MORRISON
BY Dawson, Tilton, Fallon, Lungmus, Alexander
ATT'YS United States Patent Office 3,276,809
Patented Oct. 4, 1966

3,276,809
BUNCHING HOOK
Samuel Vaines, Toronto, Ontario, and Ewen Morrison, Port Coquitlam, British Columbia, Canada, assignors to Esco Corporation, Portland, Oreg., a corporation of Oregon
Filed Feb. 4, 1964, Ser. No. 342,353
8 Claims. (Cl. 294—74)

This invention relates to a bunching hook, and, more particularly, to a hook employed with a winchline such as a wire rope cable, having an end provided with a ferrule.

The invention finds utility in logging wherein a cable is attached at one end thereof about a log for lifting or dragging along from one site to another. A wide variety of hooks have been used by loggers through the years, and the two principal characteristics of choker hooks have only been imperfectly realized in the prior art hooks. These characteristics involve a secure lock of the ferrule within the hook, and, secondly, a substantial absence of kinking of the cable in the portion carried by the hook. Imperfect realization of either of these attributes means an operation characterized by danger to the operating personnel and surrounding property. Specifically, the prior art hooks have been unable to "bunch" properly.

It is, therefore, an objective of this invention to provide a novelly constructed bunching or winchline hook which maximizes these functions and wherein the various parts of the hook cooperate in a novel fashion to develop maximum locking action of the ferrule with minimum kinking.

Another object of the invention is to provide a winchline hook adapted to seat and lock within its confines the ferrule-equipped end of a cable through the use of a novelly arranged slot which further cooperates with the remainder of the body in providing a slip sleeve characterized by minimum imposition of kinking stress on the cable.

Still another object is to provide a winchline hook wherein the slip sleeve portion or reeveway for the cable is inclined relative to the main axis of the body through the use of a unique arcuate configuration whereby both minimum kinking and maximum locking functions are made available to the art.

Other objects and advantages of the invention may be seen in the details of construction and operation set down in this specification.

The invention is described in conjunction with the accompanying drawing, in which.

Figure 1:
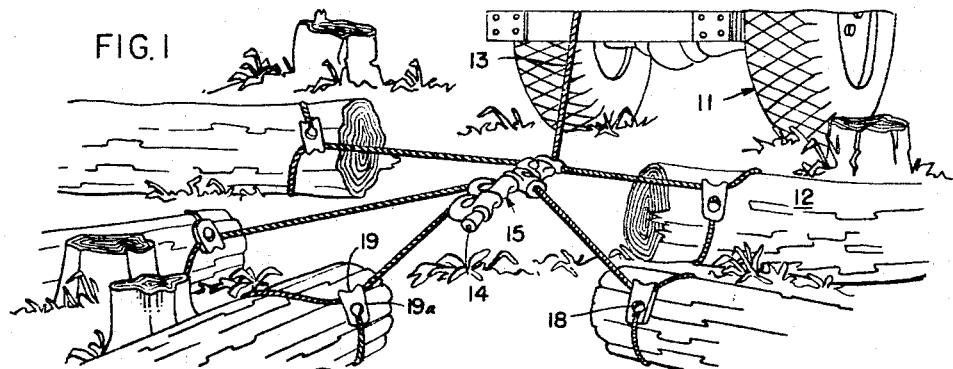
FIG. 1 is a perspective elevational view of a typical logging operation employing the use of the inventive hooks.

In the illustration given and with particular reference to FIG. 1, the numeral 11 designates an arch-equipped tractor employed for pulling logs 12. Conventionally, this is achieved through the use of a winchline 13 equipped with an end ferrule 14 (see FIG. 9). Mounted on the winchline 13 are a plurality of the inventive hooks generally designated 15, which are arranged in "bunched" relation. Connected to each hook 15 is a wire rope 16 having end ferrules 17 and 18. The log end ferrule 18 is received within a choker hook 19, while the towing end ferrule 17 is received within the bunching hook 15. The inventive hook 15 is seen in enlarged detail in FIGS. 2–8.

Figure 2:
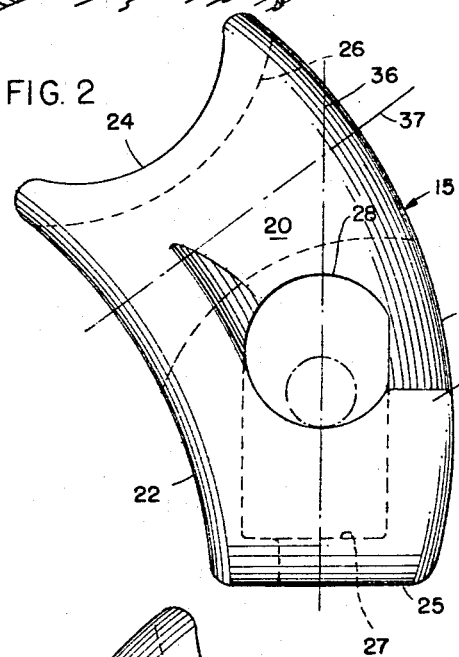
FIG. 2 is a front elevational view, on enlarged scale, of the inventive hook.

Referring now to FIG. 2 in particular, the bunching hook 15 is seen to include a unitary body optimally constructed of alloy steel and having a hardness in the range of 300–340 Brinell hardness number. The hook 15 is defined essentially by six walls which include a front wall 20 (compare FIGS. 2 and 3) which is so denominated because the ferrule ultimately seated within the hook is introduced into the hook through the front wall 20. The corresponding wall on the other side of the hook 15 is denominated to rear wall and is designated 21 (compare FIGS. 3 and 4). Two side walls further characterize the hook, these being designated 22 and 23, the wall 22 being essentially concave when viewed in elevation, while the wall 23 is convex when so viewed. Completing the definition of the hook 19 is a top wall 24 and a bottom wall 25.

The hook 15 has a slip sleeve or reeveway 26 positioned adjacent the upper end wall 24 and which receives the winchline 13.

The hook 15 is further equipped with a generally cylindrical socket 27 which ultimately seats and locks the towing end ferrule 17. Providing access to the socket 27 is a front wall opening 28, and an angularly downwardly inclined slot 29 (see FIG. 3), which terminates in an aperture 30 provided in the bottom wall 25. The rear wall 21 is also equipped with an opening communicating with the socket 27, this opening being seen clearly in FIG. 4 wherein it is designated 31.

It is believed that a summary of the operation of the inventive hook 15 will further aid in an understanding of the invention, and for this purpose the following is set down:

*Operation*

The cable 16 is initially provided at the site of logging equipped with its log end ferrule 18 and being threaded through the slip sleeve 19a of the choker hook 19. The ferrule 18 is usually swaged on the wire rope cable 16.

Figure 3:
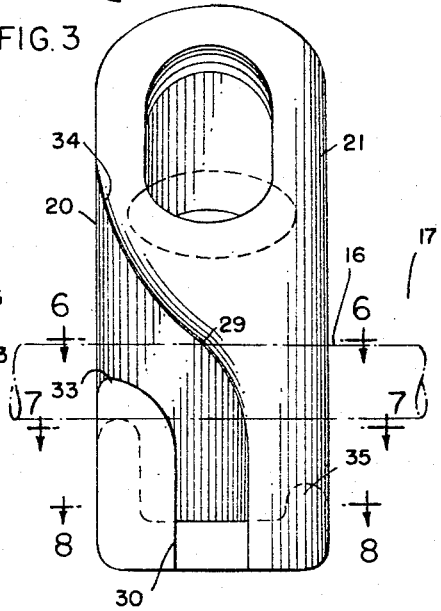
FIG. 3 is a side elevational view of the hook of FIG. 2.
Figure 4:
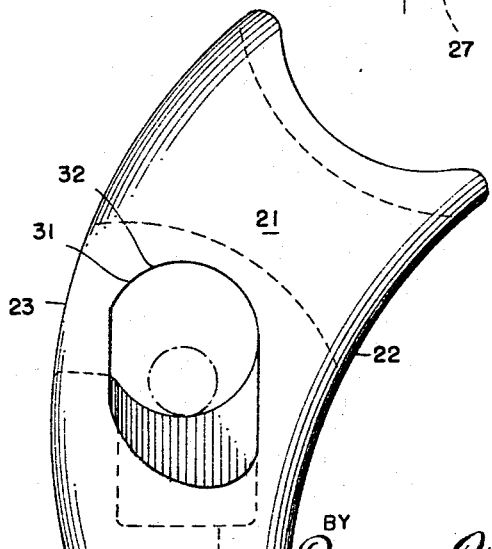
FIG. 4 is a rear elevational view of the inventive hook.
Figure 5:
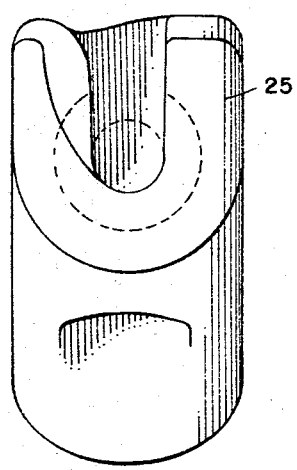
FIG. 5 is a bottom plan view of the hook shown in the preceding figures.
Figure 6:
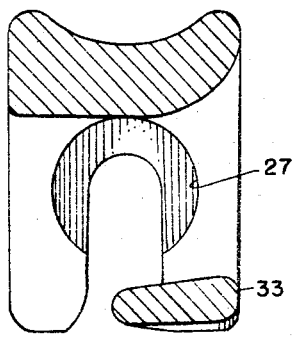
FIGS. 6-8 are sectional views, taken along the sight lines 6—6, 7—7, and 8—8, respectively, as applied to FIG. 3.
Figure 7:
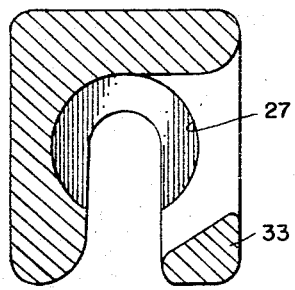
Figure 8:
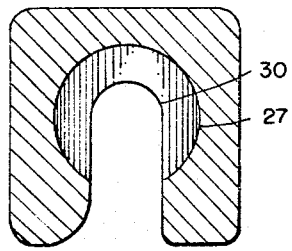

After the cable 16 is installed about a log 12, the towing end ferrule 17 is introduced into the front wall opening 28 and thrust completely through the bunching hook 15 until it emerges from the large opening 31 in the rear wall 21 (see FIG. 3). A portion of the cable 16 spaced from the ferrule is moved angularly downwardly in the slot 29, ultimately lying in the aperture 30, whereupon the ferrule can be moved or retracted through the opening 31 into seating relation with the socket 27.

The ferrule thus seated is restricted against inadvertent removal by the socket configuration which has an arched top as at 32 (See FIG. 4) and the projection 33 (see FIGS. 2, 6 and 7) which is developed by the angular slot in passing from the side wall 23 to the opening 28 in the front wall 20. The slot 29 in the upper portion thereof lying in the front wall 20 is angled downwardly, as can be appreciated from a consideration of the portion designated 34 in FIG. 3. The ferrule 17 is further stabilized in the socket by virtue of the socket-providing side walls, particularly the wall as at 35 in FIG. 3. The socket 27 constitutes the inner surface of the bottom wall 25, the bottom wall 25 being seen to be essentially flat or planar, and the vertical axis 36 of the socket 27 which extends perpendicularly to the plane of the bottom wall 25 is seen to extend at an angle to the axis 37 of the slip sleeve 26. In the illustration given, this angularity is of the order of 35°, and this has been found to develop a configuration of rope wherein kinking is substantially minimized.

Figure 9:
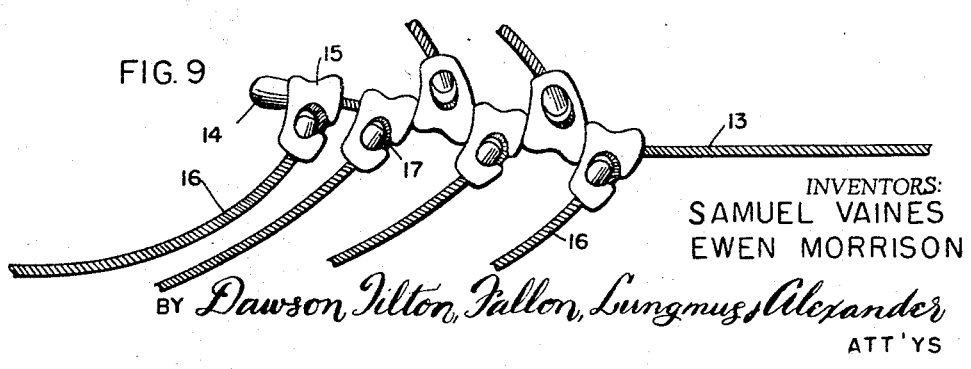
FIG. 9 is an enlarged perspective view of a portion of FIG. 1.

The winchline 13 may carry a plurality of bunching hooks 15, each releasably connected to its own choker cable 16 via seated towing end ferrule 17. The hooks 15 are seen in FIG. 9 to nest without kinking or tending to cut the wichline 13 while securely seating the ferrules 17. Each hook 15 is arranged with its curvature extending toward the towed end of the winch cable 13. For this purpose, the arcuate side walls 22 and 23 extend generally parallel to the axis 36 adjacent the lower wall 25 and generally perpendicular to the slip sleeve axis 37 adjacent the upper wall 24, the smooth curvature or transition providing an advantageous movement of one hook 15 relative to another under stress without damage to the winch cable 13.

The embodiments of the invention in which an exclusive property or privilege is claimed are defined as follows:

1. A bunching hook for use with a cable having a ferrule-equipped end, comprising a unitary metal body having front, back and opposite side walls, and an upper end wall having an arcuate inner surface defining the roof of a transverse slip sleeve extending between and opening through the side walls adjacent said upper end wall, an elongated, longitudinally-extending socket formed within the body, said body also having a lower end wall defining a base for the socket for seating a ferrule, said body having aligned openings in the front and back walls communicating with said socket whereby said ferrule is adapted to be inserted through said aligned openings, said rear wall opening being larger than said front wall opening, said body further being equipped with a slot in one of said side walls communicating with said front wall opening and adapted to pass said cable but not said ferrule for seating said ferrule in said socket, said body being arcuately formed relative to said side walls and defining a slip sleeve angularly upwardly inclined in proceeding toward said one side wall.

2. A bunching hook for use with two cables each having a ferrule-equipped end, comprising a unitary metal body having front, back, opposite side and upper and lower end walls, said lower end wall having an aperture therein, an opening extending through said body from the front to the back wall and sized to receive the ferrule of a first cable, one of said side walls having a slot communicating with the opening in said front wall and with said aperture to provide a cable-receiving slot for the first cable, said opening extending vertically downwardly to define a ferrule-receiving socket having a vertical axis whereby the ferrule-equipped end of the first cable is adaped to be inserted through said opening beyond said back wall, after which first cable is adapted to pass into said slot for retracting said first cable ferrule into said socket with the first cable portion immediately adjacent said ferrule extending through said aperture, and a slip sleeve for the second cable extending through said body and the side walls thereof above and separate from said opening, said slip sleeve having an axis forming an actuate angle with said socket axis.

3. The bunching hook of claim 2 in which said one side wall is convexly arcuate and the other side wall is concavely arcuate, said slip sleeve extending angularly upwardly in proceeding from said other side wall to said one side wall.

4. A bunching hook for use with a cable having a ferrule-equipped end, comprising a unitary metal body having front, back and opposite side walls and an upper end wall having an arcuate inner surface defining the roof of a transverse slip sleeve extending between and opening through the side walls adjacent said upper end wall, an elongated, longitudinally-extending socket formed within the body, said body also having a lower end wall defining a base for the socket for seating a ferrule, said body having aligned openings in said front and back walls, communicating with said socket whereby said ferrule is adapted to be inserted through said aligned openings, said back wall opening being larger than said front wall opening, said body further being equipped with a slot commencing at said front wall opening and proceeding angularly downwardly into one of said side walls and ultimately into said lower end wall to terminate in a cable aperture, said slot and aperture being sized to pass said cable but not said ferrule, said slot in proceeding from said front wall to said one side wall defining with said front wall opening an upwardly-extending projection, said body being arcuately formed relative to said side walls and defining a slip sleeve angularly upwardly inclined in proceeding toward said one side wall.

5. The bunching hook of claim 4 in which said projection includes a transversely enthickened portion providing part of the interior wall of said socket, the lower end wall being generally planar and having an inner surface defining the floor of said socket.

6. The structure of claim 5 in which the axis of the slip sleeve forms an angle of about 35° with the plane of said lower end wall.

7. A bunching hook for use with a pair of ferrule-equipped cables, comprising a unitary body having front, back, opposite side, and opposite end walls, and having an internal, generally cylindrical, socket for receiving and seating the ferrule of a choker cable, said socket being adjacent one body end and having a lower end opening for passing the choker cable adjacent the choker cable ferrule, said front and back walls having aligned openings sized to pass the ferrule of a choker cable with said front wall opening communicating with said lower end opening, said body having a slip sleeve adjacent its upper end above and separate from said socket and extending through said side walls for receiving a winch cable, said slip sleeve having an axis inclined relative to the socket axis with said side walls of said body being arcuate so as to be generally parallel with said socket adjacent said lower end and generally normal to said slip sleeve axis adjacent said upper end.

8. A logging installation, comprising a ferrule-equipped winch line having a ferrule end and a towed end, a plurality of bunching hooks ensleeved on said winch line, a plurality of ferrule-equipped choker cables with the ferrule of each cable being seated in a corresponding hook, each hook including a unitary body having front and back walls and a pair of correspondingly arcuate opposite side walls to provide one convex wall and one concave wall, and a slip sleeve for receiving said winch line, said winch line extending at an acute angle to each of said choker cables, said arcuate side walls being in confronting engagement to minimize kinking in said winch line, with the convex side walls of each hook facing the towed end of said winch line, said front and back walls being equipped with aligned openings for the receipt of a choker cable.

References Cited by the Examiner

UNITED STATES PATENTS 3,175,264   3/1965   Maras _____ 294—78 X

FOREIGN PATENTS 644,443   7/1962   Canada.

GERALD M. FORLENZA, *Primary Examiner.*

G. F. ABRAHAM, *Assistant Examiner.*